United States Patent [19]

Hayashi et al.

[11] Patent Number: 5,829,895
[45] Date of Patent: *Nov. 3, 1998

[54] METHOD FOR PRINTING AN IMAGE INDICATIVE OF VALUE SUCH AS A POSTAL INDICIA

[75] Inventors: Yasuhiro Hayashi, Anjyo; Yoshio Tsuru, Kani, both of Japan

[73] Assignee: Pitney Bowes Inc., Stamford, Conn.

[ * ] Notice: The term of this patent shall not extend beyond the expiration date of Pat. No. 5,806,421.

[21] Appl. No.: 579,504

[22] Filed: Dec. 27, 1995

[51] Int. Cl.$^6$ ........................................... B41J 2/30
[52] U.S. Cl. .................. 400/124.05; 400/124.27; 395/108
[58] Field of Search ................ 101/91; 400/124.04, 400/124.05, 124.27; 395/108, 109, 110

[56] References Cited

U.S. PATENT DOCUMENTS

| 4,743,127 | 5/1988 | Uematsu .................. 395/108 |
| 4,809,082 | 2/1989 | Yamaguchi et al. . | |
| 4,855,752 | 8/1989 | Bergstedt . | |
| 4,967,203 | 10/1990 | Doan et al. . | |
| 4,999,646 | 3/1991 | Trask . | |
| 5,070,345 | 12/1991 | Lahut et al. . | |
| 5,330,276 | 7/1994 | Tanida ................................... 395/108 |
| 5,347,617 | 9/1994 | Webb et al. . | |
| 5,467,709 | 11/1995 | Solomon ................................ 101/93 |

FOREIGN PATENT DOCUMENTS 56-8273   1/1991   Japan ................................ B41J 3/10

*Primary Examiner*—John S. Hilten
*Attorney, Agent, or Firm*—Steven J. Shapiro; Melvin J. Scolnick

[57] ABSTRACT

A method includes printing a dot-matrix pattern of a first one of an image on a recording medium; and printing a dot matrix pattern of a second one of the image on the recording medium which second one of the image is interlaced with the first one of the image such that a combination of the dot-matrix patterns of the first and second ones of the image result in a combined dot-matrix pattern of the image having a dot density which is greater than an individual dot density of the dot-matrix patterns of the first and second ones of the image.

7 Claims, 4 Drawing Sheets

METHOD FOR PRINTING AN IMAGE INDICATIVE OF VALUE SUCH AS A POSTAL INDICIA

BACKGROUND

This invention relates to printing an image with multiple passes of a printing mechanism and more particularly relates to printing an image indicative of value (such as a postal indicia) utilizing multiple passes of a printing mechanism relative to a mailpiece.

Traditional postage meters imprint an indicia on a mailpiece or a label to be subsequently placed on a mailpiece as evidence that postage has been paid. These traditional postage meters create the indicia using platen/ink die or a rotary drum/impression roller combinations which are moved into contact with the mailpiece to print the indicia thereon. While traditional postage meters have performed admirably over time, they are limited by the fact that if the indicia image significantly changes, a new platen/ink die or rotary drum/impression roller will have to be produced and placed in each meter. Accordingly, newer postage meters now take advantage of modern digital printing technology to overcome the deficiencies of traditional meters. The advantage of digital printing technology is that since the digital printhead is software driven, all that is required to change an indicia image is new software. Thus, the flexibility in changing indicia images or adding customized advertising slogans is significantly increased.

Modern digital printing technology includes thermal ink jet (bubble jet), piezoelectric ink jet, thermal transfer printing, and LED and laser xerographic printing which all operate to produce images in a dot-matrix pattern. In dot-matrix ink jet printing, individual print elements in the printhead such as resistors or piezoelectric elements are either electronically stimulated or not stimulated to expel or not expel, respectively, drops of ink from a reservoir onto a substrate. By controlling the timing of the energizing of each of the individual print elements in conjunction with the relative movement between the printhead and the mailpiece, a dot-matrix pattern is produced in the visual form of the desired postage indicia image.

With regard to a postage indicia, there is a need to produce an indicia image which is visually appealing and clearly readable. The indicia image must have a relatively high optical density. That is, the density of the individual dots produced by the printhead must be sufficiently high. Moreover, it is desirable that the optical density of the indicia image is sufficient enough so that the indicia image is readable using conventional optical character reader (OCR) equipment. Furthermore, when a mailpiece having an indicia image thereon is processed by, for example, the United States Postal Service (USPS), it must be detected by a conventional facer/canceler machine in order to distinguish it from both stamped mailpieces and mailpieces without a stamp or indicia thereon. The facer/canceler machine typically detects a mailpiece having an indicia by exposing the printed indicia to ultraviolet lamps and then measuring the amount of radiated light emitted back by the indicia ink. If the measured radiated light exceeds a predetermined level, the mailpiece is identified as an indicia (metered mail) and is subsequently processed to an appropriate station for further handling. It is to be noted that in the United States the indicia ink is a fluorescent ink. However, in other countries the indicia ink may be a phosphorescent ink which also emits radiated light when exposed to ultraviolet lamps such that these phosphorescent indicia can also be identified by detecting the amount of radiated light emitted therefrom. Therefore, if an indicia image is to be produced digitally in a dot-matrix pattern, the density of the individual ink dots must be sufficient to allow the fluorescence (or phosphorescence) of the indicia ink to be detected by the facer/canceler as discussed above.

In producing a dot-matrix image using a digital printhead, the individual dots in the matrix are often defined according to their relative density in two directions. That is, the dots will have a certain density (expressed as dots per inch (dpi)) in the direction of relative movement between the printing mechanism and the recording medium as well as a density in a direction perpendicular thereto, which perpendicular density is a function of the pitch (spacing) between each of the individual nozzles in the printhead. In the case of a very simple printhead having a single row of nozzles, the density of the dot-matrix pattern in the direction of relative movement between the printhead and the recording medium is dependent upon the speed of the relative movement between the printhead and the recording medium and the frequency at which the nozzles are energized. In the direction perpendicular to the relative movement, if a desired high dot density is required, the pitch between individual nozzles in the row of nozzles has to be precisely defined to result in the desired dot density. That is, the density of the nozzles themselves must be very high. As an alternative to using a printhead having a high nozzle density, a printhead could be used having two adjacent rows of nozzles that are offset from each other to obtain the desired dot density in the direction perpendicular to the relative movement of the printhead and recording medium. In this printhead configuration, the energizing timing of the nozzles in the two adjacent rows would have to be delayed relative to each other to allow individual columns of the indicia image to be created with the desired dot density. In yet another alternative, a plurality of printheads which are appropriately aligned could also be utilized to produce the desired dot density.

Each of the above-mentioned ways of producing the indicia image has serious limitations. With respect to using a single printhead having only a single row of nozzles, the complexity of producing a printhead which has the required nozzle density and is capable of printing the full height of the indicia image in a single pass of the printhead significantly drives up the cost of the printhead due to the complexity of manufacturing such a printhead which results in low manufacturing yields. In the case of using two adjacent rows of nozzles which are offset from each other, the manufacturing costs associated therewith is also relatively high and additional complexity is added to the meter electronics in order to control the delayed energizing of each of the nozzles in each of the rows to accurately produce the image without any noticeable shift in or misalignment of the indicia image. Finally, if a plurality of aligned printheads are used, the overall cost of the printing mechanism is obviously increased since two printheads are required versus one. Furthermore, as in the case of the adjacent rows of nozzles discussed above, the complexity of the electronics is increased to control the energizing sequence of the nozzles in the two printheads.

SUMMARY OF THE INVENTION

This invention is directed toward a method for printing an image indicative of value, such as a postal indicia image, which permits use of low cost printing technology. The method includes printing a dot-matrix pattern of a first one of an image on a recording medium; and printing a dot matrix pattern of a second one of the image on the recording medium which second one of the image is interlaced with the first one of the image such that a combination of the dot-matrix patterns of the first and second ones of the image result in a combined dot-matrix pattern of the image having a dot density which is greater than an individual dot density of the dot-matrix patterns of the first and second ones of the image.

BRIEF DESCRIPTION OF THE DRAWINGS

The accompanying drawings, which are incorporated in and constitute a part of the specification, illustrate a presently preferred embodiment of the invention, and together with the general description given above and the FIG. 1 is a perspective view of a postage meter incorporating the claimed invention;

FIG. 2 is a perspective view of the structure for moving the printing mechanism within the postage meter of

DETAILED DESCRIPTION OF THE PREFERRED EMBODIMENTS

Figure 1:
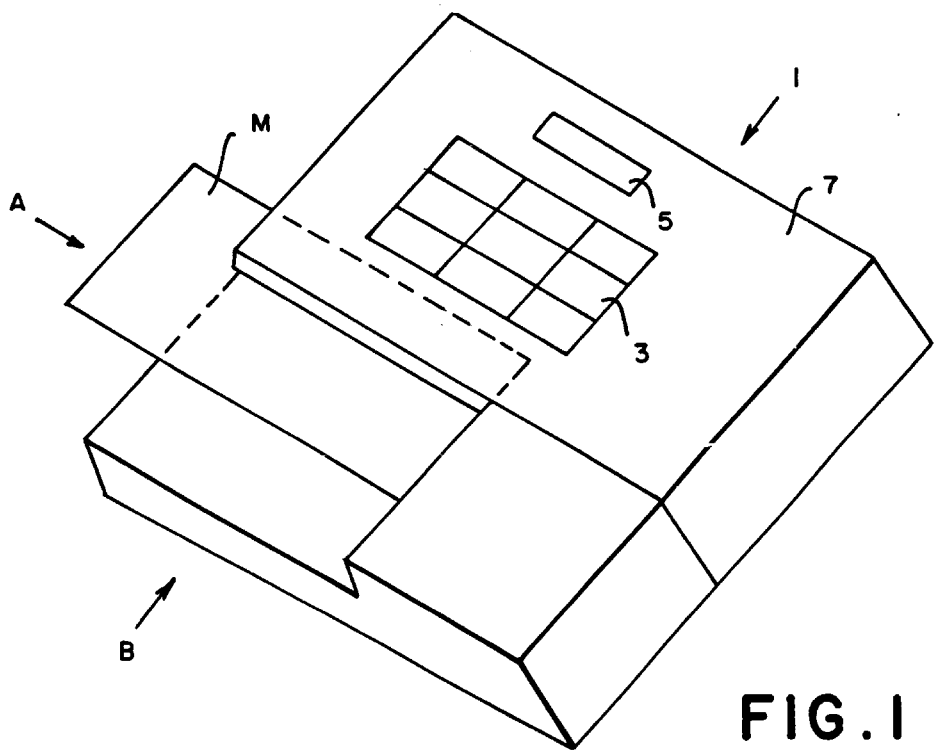
FIG. 1.

Referring to FIG. 1, there is shown a new low cost postage meter 1 having a very small footprint and intended for use in the home or small business environment. Mailpieces "M" (which for the purposes of this application include envelopes, labels, flats, etc.) are fed to the postage meter 1 in either the direction of arrows "A" or "B" until a sensor (not shown), such as a microswitch, is activated by the mailpiece "M" thereby identifying the presence of the mailpiece "M". Upon identification of the mailpiece "M", a printing mechanism 9 (see FIG. 2) moves across the stationary mailpiece "M" to print the indicia image as will be discussed in more detail below. Prior to printing, the operator will have entered the postage required via individual keypad buttons 3 and the electronics in the low cost meter will have verified that a particular postage transaction is permissible. Thus, once the transaction has been authorized, detection of the mailpiece "M" by the microswitch triggers movement of the printing mechanism 9. As noted in FIG. 1, a display 5 is disposed in a top cover portion 7 of postage meter the microswitch triggers movement of the printing mechanism 9. As noted in FIG. 1, a display 5 is disposed in a top cover portion 7 of postage meter 1. The display 5 permits the postage meter 1 to visually prompt any required input by the operator and to display the operator's input which has been entered through the keypad buttons 3.

Figure 2:
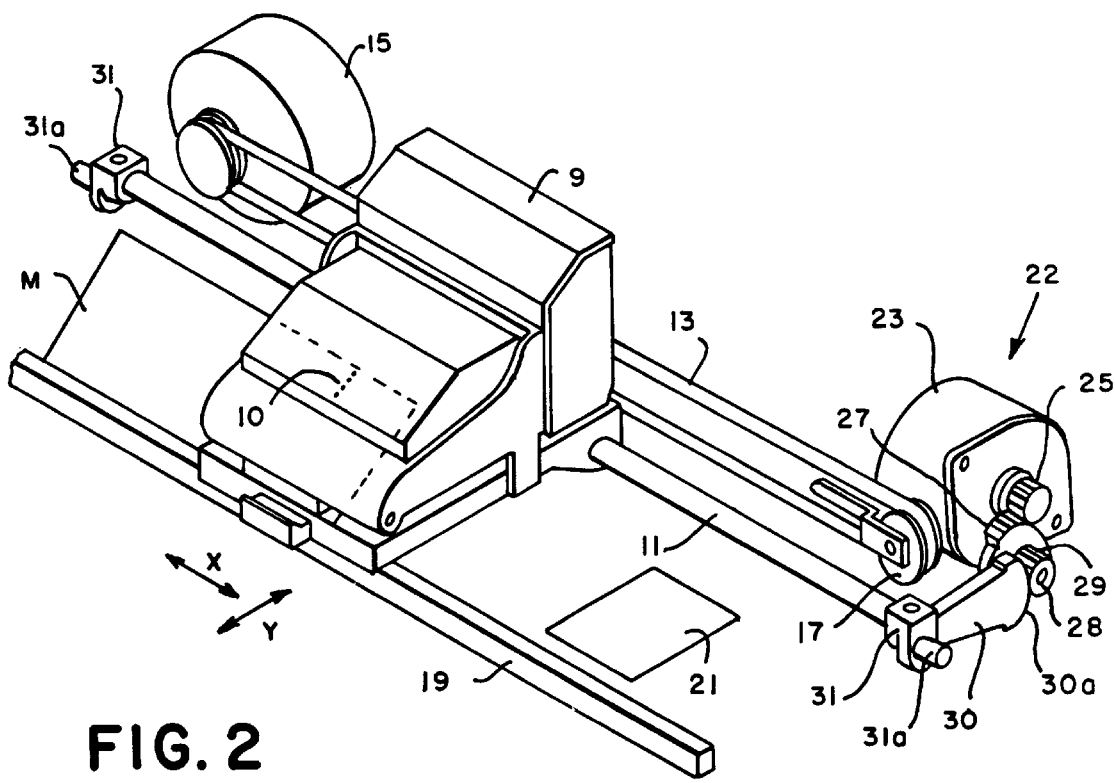

Regarding the movement of the printing mechanism across the mailpiece "M" reference is made to FIG. 2. FIG. 2 shows a portion of the postage meter 1 which is housed under cover 7 and which permits movement of printing mechanism 9 in the directions of arrows "X" and "Y". Printing mechanism 9 is preferably an ink jet printer having a single row of nozzles 10 arranged transversely to the direction of arrow "X". However, any dot matrix producing printer could be used. Printing mechanism 9 is rotatably mounted on a guide bar 11 and connected to an endless belt 13 driven into rotation by a motor 15. Thus, via the movement of the motor 15 and belt 13, printing mechanism 9 is capable of being moved in a reciprocating manner between the motor 15 and an idler pulley 17. Moreover, the front end of printing mechanism 9 rests on a fixed support surface 19 and slides there along. A maintenance station is shown schematically at 21. The maintenance station 21 is a conventional structure at which purging, wiping and sealing of the nozzles 10 occurs during moments of non-printing. Printing mechanism 9 is positioned at the maintenance station 21 when not being utilized for printing. Thus, when the microswitch detects the presence of the mailpiece "M" in the postage meter 1, a postage meter microcontroller 43 (see FIG. 3) controls the operation of motor 15 to move printing mechanism 9 from maintenance station 21 and across the face of mailpiece "M" to print the postage indicia thereon.

As previously discussed, and in order to make use of a printing mechanism 9 which is a low cost/low nozzle density unit, a plurality of passes of printing mechanism 9 over mailpiece "M" is required in order to produce a postage indicia image having an acceptable density in both the "X" and "Y" directions. The density of the dots in the "X", direction is easily controlled, via the microcontroller 45 (see FIG. 3), by coordinating the movement of printing mechanism 9 via motor 15 in the "X" direction together with the firing frequency of the individual nozzles 10. That is, the slower printing mechanism 9 is moved in the "X" direction for a given nozzle 10 firing frequency, the greater the dot density will be in that direction. With regard to the "Y" direction, printing mechanism 9 must be shifted in the Y direction after each pass of printing mechanism 9 in the "X", direction in order to increase the dot density of the produced indicia image along the "Y" direction.

The preferred structure for moving printing mechanism 9 in the "Y" direction is shifting mechanism 22 which includes a motor 23 operatively engaged to rotate a first gear 25 in either direction, a gear segment 27 which is intermeshed with first gear 25 and fixedly mounted on a shaft 28 that is rotatably mounted in a conventional manner in the postage meter 1, a second gear 29 fixedly mounted on shaft 28 and intermeshed with a shift arm 30 via teeth 30a, and an L-shaped housing structure 31 which is mounted for rotation in a convention manner in postage meter 1 and in which guidebar 11 is eccentrically disposed relative to the center line of a hub portion 31a of housing 31. In a preferred embodiment, housing 31 is a single molded component including shift arm 30. The shifting mechanism 22 works as follows. Once the first pass of printing mechanism 9 in the "X" direction is completed, and it returns to its initial position, motor 23 causes a rotation of housing 31 and shift arm 30 via the gear train 25, 27, 29 and 30a. The rotation of housing 31 causes a corresponding movement of guide rod 11. However, since guide rod 11 is eccentrically mounted relative to the center line of hub 31a (around which housing 31 is forced to rotate) it moves along an arc such that there is a movement of printing mechanism 9 predominantly in the "Y" direction. The gear train is designed such that the amount of movement in the "Y" direction is a function of the spacing between the nozzles 10 and the number of passes of the printing mechanism 9 to be made as previously discussed. It should be noted that since the printing mechanism 9 is free to rotate about guide rod 11 while resting on support 19, any upward or downward movement of guide rod 11 is negligible such that the orientation of nozzles 10 relative to mailpiece "M" remains substantially unchanged and does not impact the quality of printing. It is also to be noted that the opposite end of guide rod 11 is mounted in an identical housing 31 which is rotatably mounted in the main side frame of the postage meter 1.

Figure 3:
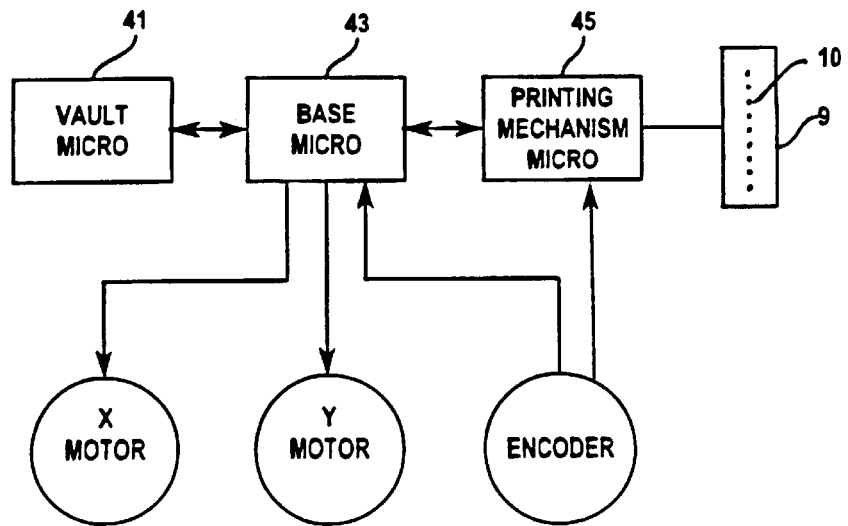
FIG. 3 is a schematic block diagram of the control system of the postage meter of FIG. 1.

While the synchronization of the moving of printing mechanism 9 with the energizing of nozzles 10 is well known in the art, a brief schematic overview of a postage meter architecture utilizing such principles is shown in FIG. 3. The postage meter 1 includes a vault microprocessor 41, a base microprocessor 43, and a printing mechanism microprocessor 45. Vault microprocessor 41 perform funds accounting, while base microprocessor 43 manages the message interaction between the operator and the postage meter 1 via display 5. In addition, base microprocessor 43 acts as a communication channel between vault microprocessor 41 and printing mechanism microprocessor 45. Postage meter 1 also includes a conventional encoder 47 which provides a signal indicating the "X" position of printing mechanism 9. The encoder signal is used by base microprocessor 43 to control operation of the motors 15, 23 and is used by printing mechanism 45 to synchronize energizing of nozzles 10 with the movement of printing mechanism 9.

Figures 4A, 4B, 4C:
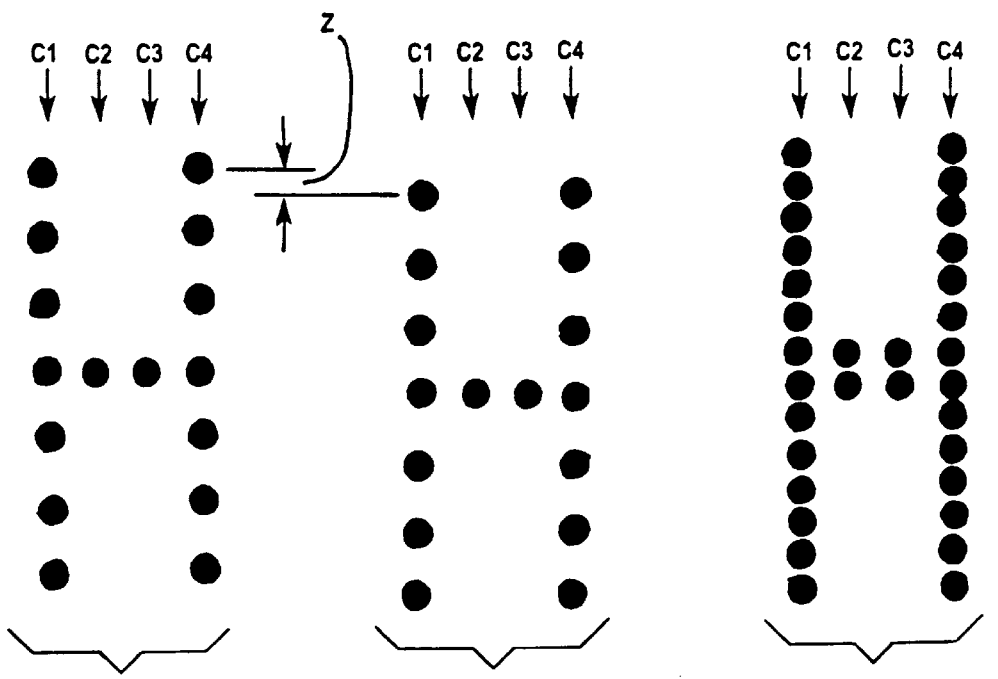
FIGS. 4(a), (b), and (c) together show the printing sequence of a representative indicia character.

Referring to FIGS. 4(a), 4(b) and 4(c) there is shown in an enlarged view the steps for printing a single letter at a desired vertical dot density utilizing a printing mechanism 9 having a low nozzle density. FIG. 4(a) shows the results of a single pass of printing mechanism 9 in producing the letter "H". That is, assuming printing mechanism 9 is moving from left to right in FIG. 4(a), it can be energized in a known manner as it moves to produce the letter "H". Assuming, for example and ease of explanation, that there is only a single row of 7 nozzles 10 in printing mechanism 9 and the speed of printing mechanism 9 has been coordinated with the frequency of firing of the nozzles 10 such that individual nozzles 10 are energized when printing mechanism 9 is at any of the column 3 positions C1, C2, C3, and C4. The letter "H" is produced by energizing all of the nozzles 10 when the printing mechanism is at column Cl, energizing only the fourth or middle nozzle 10 when the printing mechanism is at columns C2 and C3 and lastly energizing all of the nozzles 10 when the printing mechanism 9 is in the position of column 3 C4. The letter "H" produced during this first pass of printing mechanism 9 has a low dot density. That is, the dots in the vertical or height direction of the letter "H" are fairly well spaced apart such that a large amount of the white background of the paper shows through. In order to improve the visual quality of the letter "H", in this example, a second pass of printing mechanism 9 is made which is complimentary in nature to the first pass. That is, during a second pass of printing mechanism 9, in either the left to right or right to left directions, an identical image of the letter "H" can be produced. The only difference between the first and second letter "H" images is that during the second pass printing mechanism 9 is shifted down by ½ of the pitch of the vertical spacing between individual nozzles 10 and therefore correspondingly ½ of the spacing between the ink dots of the first image. During the second pass of printing mechanism 9 the nozzles 10 will still be controlled to be energized at columns C1, C2, C3, and C4 just as they were during the first pass such that the dot density in the direction of movement of printing mechanism 9 will not be changed. FIG. 4(b) shows that the letter "H" produced during the second pass is shifted by ½ the center to center vertical spacing "Z" of the dots of the first image "H". While FIGS. 4(a) and 4(b) have been shown separately to identify exactly what image is produced during each of the first and second passes of printing mechanism 9, FIG. 4(c) shows the finally produced image "H" which is an interlaced combination of the individual "H's" formed during the first and second passes of printing mechanism 9. It is quite clear that the finally produced image "H" has a dot density in the vertical direction which is twice as much as the vertical dot density individually produced during either the first or second passes of printing mechanism 9.

The above procedure can be repeated for additional passes of printing mechanism 9 to further increase the dot density of the finally produced image in the vertical or height direction of the image. Thus, for example, if the finally produced "H" required 3 passes of printing mechanism 9, prior to the second pass printing mechanism 9 would be shifted along the height of the image by ⅓ of the pitch of the nozzles 10 and prior to the third pass printing mechanism 9 would be shifted again by ⅓ of the pitch of nozzles 10 relative to the position of printing mechanism 9 during the second pass thereof. Thus, the spacing of each pass is dependent upon the number of passes and the nozzle pitch.

Figure 5:
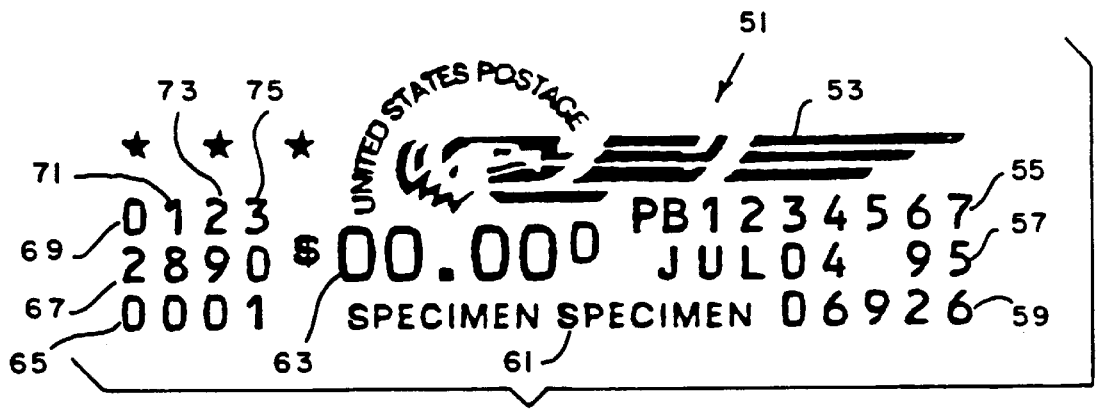
FIG. 5 shows a representative indicia produced by the method of FIG. 4.

While the above description, for simplicity, was only applied to the printing of a single letter, the Applicants have applied this basic principle to produce a full postal indicia image. FIG. 5 shows an enlarged representative example of a typical postage indicia which can be printed by postage meter 1 for use in the United States. The postage indicia 51 includes a graphical image 53 including the 3 stars in the upper left hand comer, the verbiage "UNITED STATES POSTAGE", and the eagle image; a meter identification number 55; a date of submission 57; the originating zip code 59; the originating post office 61, which for the ease of simplicity is just being shown with the words "SPECIMEN SPECIMEN"; the postage amount 63; a piece count 65; a check digits number 67; a vendor I.D. number 69; a vendor token 71; a postal token 73; and a multipass check digit 75. While most of the portions of the indicia image 51 are self explanatory, a few require a brief explanation. The vendor I.D. number identifies who the manufacturer of the meter is, and the vendor token and postal token numbers are encrypted numbers which can be used by the manufacturer and post office, respectively, to verify if a valid indicia has been produced.

The FIG. 5 indicia is simply a representative example and the information contained therein will vary from country to country. In the context of this application the terms indicia and indicia image are being used to include any specific requirements of any country.

The Applicants initially utilized a 3 pass approach as described above in connection with FIG. 4 for producing the indicia 51. In their initial experiments, the Applicants utilized a printing mechanism 9 having a single column of nozzles which were capable of producing a dot density of 80 dpi. The drop size from each nozzle was approximately 50 pico liters resulting in an average ink dot size deposited on the paper of 4.2 mils in diameter. Thus, for a single column produced by the nozzles 10, approximately ⅔ of the swath area would be ink free. Therefore, to get as close as possible to producing in each column a solid line, three passes of printing mechanism 9 were made in an interlaced relationship to each other. Thus, during a single pass of printing mechanism 9 from either the right to left or left to right direction as viewed in FIG. 5, the first pass of printing mechanism 9 produced the indicia image 51 having an indicia height dot density of 80 dpi. Moreover, the movement of printing mechanism 9 was synchronized with the firing frequency of nozzles 10 to produce a density along the length of the indicia image 51 of 240 dots per inch. During the second and third passes of the printing mechanism 9 over the area covered by the indicia 51, printing mechanism 9 was shifted by ⅓ the pitch density of the nozzles 10 to produce a final indicia image 51 which was the combination of 3 interlaced full indicia images. The finally produced indicia image 51 had a dot density of 240 dpi in the height direction of the indicia and a corresponding dot density of 240 dpi in the length direction and was approximately 0.8 inches in height. It is important to note that the three individual indicia images printed during each pass do not have to be an identical dot pattern. Rather, each image printed during each pass appears visually to look like an indicia 51 but their individual dot patterns may differ slightly depending upon the desired dot density and thickness of specific parts of the final combination indicia 51.

While the above method produces the indicia 51 which is capable of being read by OCR equipment as well as being detected by the facer/canceler machine, a potential security problem exists in that if someone stacked three envelopes in the postage meter 9 and pulled out one envelope after each pass of printing mechanism 9, three envelopes would be produced each having an indicia image 51 of 240 dpi by 80 dpi. While the density of these individual indicia images would not likely be detected by the facer/canceler machine or be readable by OCR equipment, a risk still exists that all 3 envelopes could be used while the postage meter 1 only accounted for printing of a single indicia. That is, even if the facer/canceler machine did not detect the indicia, the envelopes would simply be passed to another station for a visual inspection. It is quite possible that during the visual inspection the 80 by 240 dpi indicia could be considered as a valid indicia.

Figure 6A:
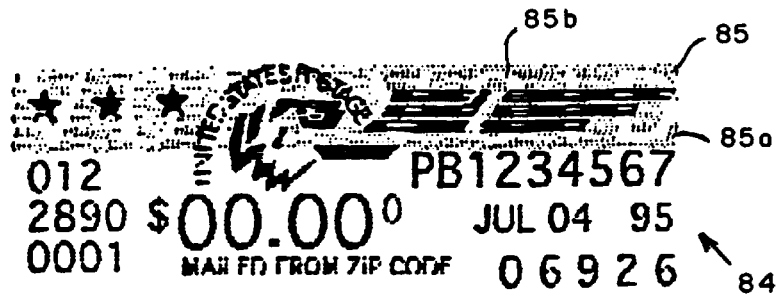
FIGS. 6(a), (b), (c), (d), and (e) together show a method of securely printing an indicia including a water mark.
Figure 6B:
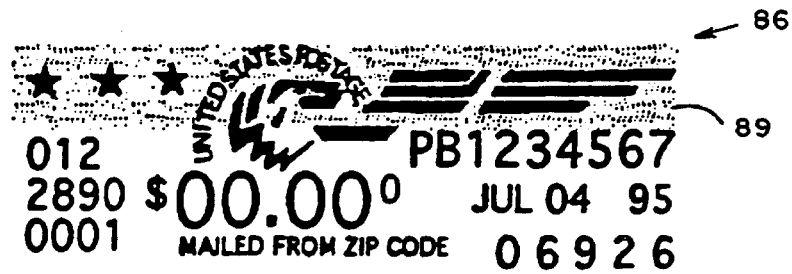

FIGS. 6(a), (b), (c), (d) and (e) show a modification of the inventive interlaced printing method previously described which overcomes the security problem discussed above. This method includes printing an indicia in only two passes and further requires printing a watermark like area in part or all of the indicia area. That is, during a first pass of printing mechanism 9 indicia 84 is produced having a dot density along its height of 80 dpi and a dot density along its length of 480 dpi. In addition to the indicia 84, a water mark 85 is also produced during the first pass. The water mark 85 includes a plurality of vertical wavy lines 85(a). During the first pass of printing mechanism 9, the watermark 85 is printed so that it does not significantly reduce image contrast thereby allowing the indicia 84 to be clearly visible. However, watermark 85 is sufficiently dense so that a portion thereof 85(b), where there is an absence of ink dots, spells out in large letters a warning such as the word "VOID". Prior to the second pass of printing mechanism 9, it is shifted along the height of indicia 84 by ½ the nozzle 10 pitch. Then, during the second pass a full indicia of 80 dpi ×80 dip (not shown) is printed in interlaced relationship with the first produced indicia 84. Moreover, during the second pass of the printing mechanism 9 ink dots are also deposited to fill the "VOID" wording of the water mark 85, essentially eliminating any visual recognition of the word "VOID" to produce the final indicia and watermark image 86 of FIG. 6(b). Accordingly, if two envelopes are stacked together, the indicia image 84 produced after the first pass would have a visual indication that the indicia image 84 is not valid since the watermark 85 contains the word "VOID".

Figure 6C:
Figure 6D:
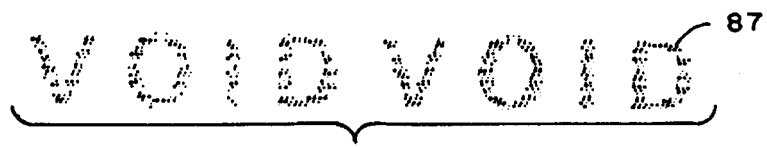
Figure 6E:
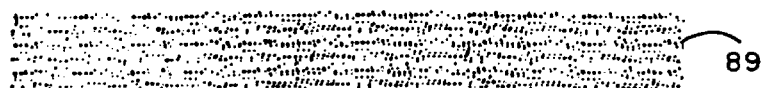

FIGS. 6(c),and 6(d) respectively show those portions 85, 87 of the final watermark 89 which are produced during the first and second passes, while FIG. 6(e) shows the interlaced combination of those two passes.

What is claimed is:

1. A method for printing with a printing mechanism an image indicative of value on a recording medium, the method comprising the steps of:

A) during a first pass between the printing mechanism and the recording medium printing a dot-matrix pattern of a first one of the image on the recording medium together with a watermark having an area void of ink dots wherein the area void of ink dots is indicative that the first one of the image is not a valid image; and B) printing a dot-matrix pattern of a second one of the image on the recording medium together with a plurality of ink dots complementary to the watermark having the area void of ink dots, the second one of the image being interlaced with the first one of the image such that a combination of the dot-matrix patterns of the first and second ones of the image result in a combined dot-matrix pattern of the image having a dot density which is greater than an individual dot density of the dot matrix patterns of the first and second ones of the image and the plurality of ink dots fill in the area void of ink dots.

2. A method as recited in claim 1, further comprising printing during steps A) and B) with a single color ink.

3. A method as recited in claim 2, wherein the printing mechanism includes a single row of nozzles to perform the printing of steps A) and B) and further comprising moving the printing mechanism and the recording medium relative to each other and substantially perpendicular to the single row of nozzles during the printing steps A) and B).

4. A method as recited in claim 1, wherein the first and second ones of the image printed during steps A) and B) and the combined dot-matrix pattern of the image are each a postal indicia.

5. A method as recited in claim 4, wherein the recording medium upon which printing occurs is a mailpiece.

6. A method as recited in claim 1, wherein the area void of ink dots spells out the warning indicative that the first one of the image is not a valid image.

7. A method for printing with a printing mechanism an image indicative of value on a recording medium, the method comprising the steps of: A) during a first pass between the printing mechanism and the recording medium printing a dot-matrix pattern of a first one of the image on the recording medium together with a watermark having an area void of ink dots wherein the area void of ink dots is indicative that the first one of the image is not a valid image;and B) printing a dot-matrix pattern of a second one of the image on the recording medium together with a plurality of ink dots that match the area void of ink dots, the second one of the image being interlaced with the first one of the image such that a combination of the dot-matrix patterns of the first and second ones of the image result in a combined dot-matrix pattern of the image having a dot density which is greater than individual dot density of the dot-matrix patterns of the first and second ones of the image and the plurality of ink dots fill in the area void of ink dots.

* * * * *